(12) United States Patent
Kim et al.

(10) Patent No.: US 12,346,527 B2
(45) Date of Patent: Jul. 1, 2025

(54) TOUCH SENSOR

(71) Applicant: DONGWOO FINE-CHEM CO., LTD., Iksan-si (KR)

(72) Inventors: Byoungin Kim, Seoul (KR); Cheol Hun Lee, Pyeongtaek-si (KR); Minseok Jang, Pyeongtaek-si (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 0 days.

(21) Appl. No.: 18/578,219

(22) PCT Filed: Aug. 1, 2022

(86) PCT No.: PCT/KR2022/011337
§ 371 (c)(1),
(2) Date: Jan. 10, 2024

(87) PCT Pub. No.: WO2023/014025
PCT Pub. Date: Feb. 9, 2023

(65) Prior Publication Data
US 2024/0310967 A1  Sep. 19, 2024

(30) Foreign Application Priority Data
Aug. 6, 2021 (KR) .................. 10-2021-0104122

(51) Int. Cl.
*G06F 3/044* (2006.01)
(52) U.S. Cl.
CPC .. *G06F 3/0446* (2019.05); *G06F 2203/04103* (2013.01)

(58) Field of Classification Search
CPC ......... G06F 3/0446; G06F 2203/04103; G06F 2203/04112; G06F 3/041; G06F 3/04164; G06F 3/0443; G06F 3/044; G06F 3/0448
See application file for complete search history.

(56) References Cited

U.S. PATENT DOCUMENTS

| | | | |
|---|---|---|---|
| 9,588,623 B2 * | 3/2017 | Chang | G06F 3/0412 |
| 10,539,979 B2 * | 1/2020 | Ha | G06F 3/03545 |
| 2014/0347319 A1 * | 11/2014 | Lin | G06F 3/0445 |
| | | | 345/174 |

(Continued)

FOREIGN PATENT DOCUMENTS

| KR | 10-1006435 B1 | 1/2011 |
|---|---|---|
| KR | 10-1068285 B1 | 9/2011 |

(Continued)

OTHER PUBLICATIONS

International Search Report for PCT/KR2022/011337 dated Dec. 26, 2022 (PCT/ISA/210).

*Primary Examiner* — Amy Onyekaba
(74) *Attorney, Agent, or Firm* — Sughrue Mion, PLLC

(57) ABSTRACT

A touch sensor includes a first sensing cell part and a first wiring part. The first sensing cell part arranges first sensing cell line groups by a first repetition number to be spaced apart in an X-axis direction. The first wiring part is formed in one outer bezel area in a Y-axis direction from the first sensing cell part. The first wiring part includes a first outgoing wire group connected to the first sensing cell line group and a first dummy wire group not connected to the first sensing cell line group.

9 Claims, 2 Drawing Sheets

(56) References Cited

U.S. PATENT DOCUMENTS

| | | | |
|---|---|---|---|
| 2015/0227233 A1* | 8/2015 | Yi | G06F 3/0446 |
| | | | 345/174 |
| 2015/0261255 A1* | 9/2015 | Takeuchi | G06F 1/165 |
| | | | 345/173 |
| 2016/0147375 A1* | 5/2016 | Bok | G06F 3/0448 |
| | | | 345/175 |
| 2017/0031514 A1* | 2/2017 | Kimura | G02F 1/13338 |
| 2017/0308201 A1 | 10/2017 | Xie et al. | |
| 2018/0275801 A1* | 9/2018 | Nakayama | G06F 3/047 |
| 2021/0004112 A1* | 1/2021 | Miyamoto | G06F 3/0443 |
| 2024/0028174 A1* | 1/2024 | Kitamura | G06F 3/04164 |

FOREIGN PATENT DOCUMENTS

| | | | |
|---|---|---|---|
| KR | 10-2018-0046642 A | | 5/2018 |
| KR | 10-2019-0006660 A | | 1/2019 |
| KR | 10-2020-0112757 A | | 10/2020 |
| KR | 20200112757 A | * | 10/2020 |
| WO | 2015/038282 A1 | | 3/2015 |

* cited by examiner

【Figure 1】
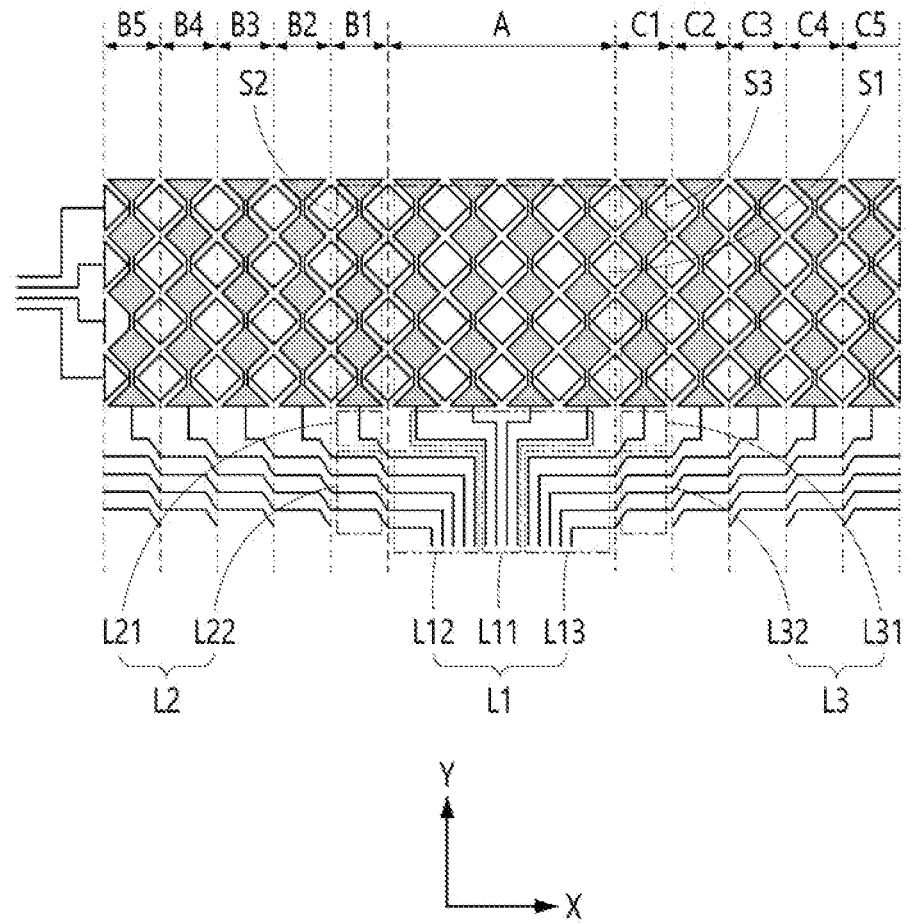
【Figure 2】
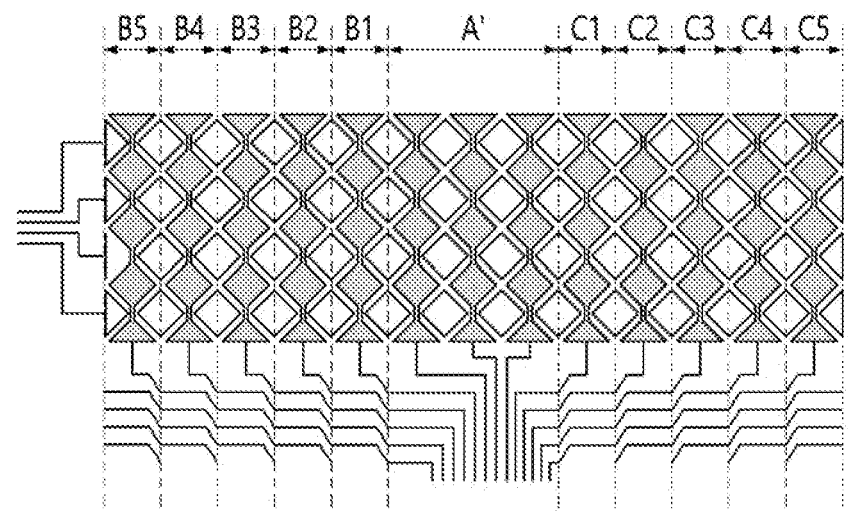

[Figure 3]
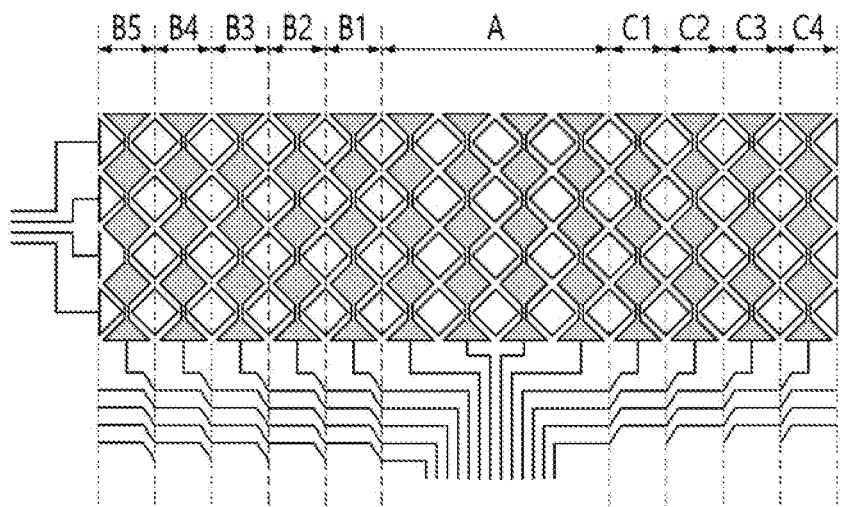
[Figure 4]
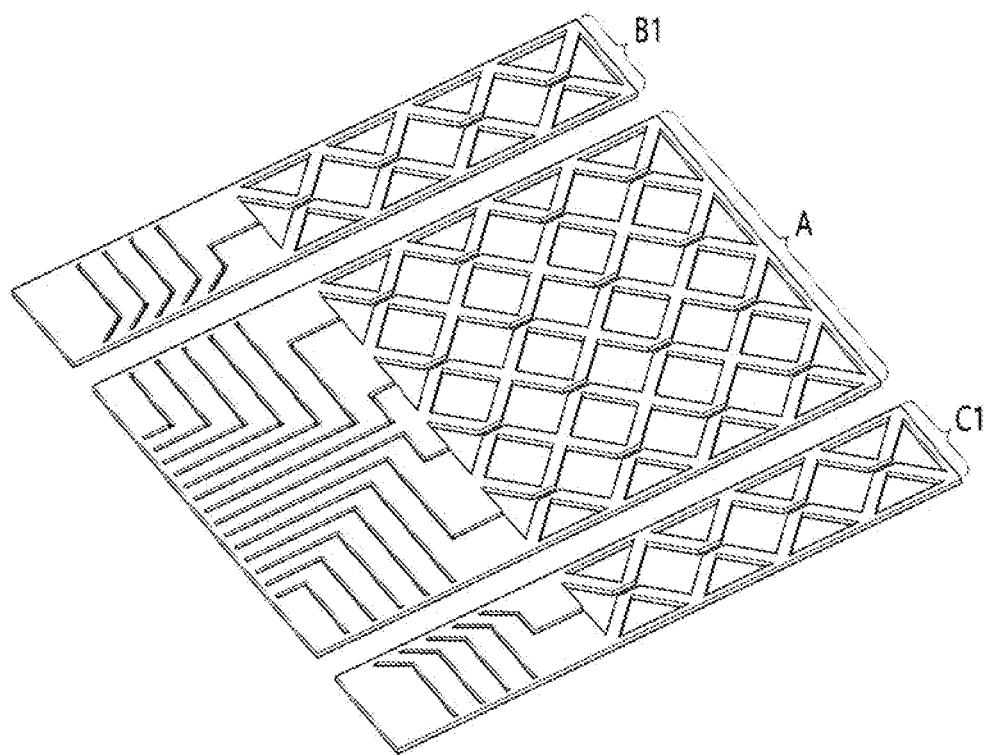

TOUCH SENSOR

CROSS REFERENCE TO RELATED APPLICATIONS

This application is a National Stage of International Application No. PCT/KR2022/011337 filed Aug. 1, 2022, claiming priority based on Korean Patent Application No. 10-2021-0104122 filed Aug. 6, 2021.

TECHNICAL FIELD

The present invention relates to a touch sensor. Particularly, the present invention relates to a large-area touch sensor that can be formed with an enlarged pattern area as desired by a stitch method while disposing pad electrode connection wiring connecting a bonding pad in the center.

BACKGROUND ART

A touch sensor of a smartphone or the like is an input device that receives a touch command. There are a resistive type, a capacitive type, an ultrasonic type, an infrared type, and so on, according to the sensing method of a touch part. Recently, the capacitive type is mainly used.

The capacitive type uses a transparent substrate on which a conductive thin film is formed. In the capacitive type, when a user touches a surface of a transparent substrate with a certain amount of voltage maintained on the surface of the transparent substrate, the voltage changes at the contact surface. The capacitive type detects the change in voltage to sense whether it is touched.

A touch sensor includes a plurality of sensing cells arranged in X and Y axis directions on a transparent substrate to accurately determine the contact location. The sensing cells are classified into the first sensing electrodes arranged and connected in the X axis direction and the second sensing electrodes arranged and connected in the Y axis direction. The first and second sensing electrodes may be respectively connected to the first and second wiring parts.

The first and second wiring parts may extend along side edges of the transparent substrate to be connected to pad electrodes formed at an edge of the transparent substrate. The pad electrode may then be connected to a bonding pad of a flexible printed circuit board (FPCB).

Patent Registration No. 1068285 discloses 'LCD exposure mask pattern and method for exposure.' Patent Registration No. 1068285 proposes a method for improving stitch defects and image quality by using a lego pattern exposure in sub-pixel or pixel units of a liquid crystal display device.

However, it is difficult to apply the conventional exposure mask when a pad part is formed in the middle area of the repeating section. In particular, it is difficult to respond to a reality in which a long display in one direction is in increasing demand.

DISCLOSURE OF INVENTION

Technical Problem

The present invention is to solve the above problems of the prior art and intends to provide a large area touch sensor that can be manufactured by freely adjusting (enlarging) the pattern area with a stitch method while arranging the pad electrode connection wiring connecting the pad part, that is, the bonding pad, in the central area of the long side of the rectangular touch sensor.

Technical Solution

A touch sensor of the present invention to achieve such an object may include a non-repeating pattern part having a first sensing cell part and a first wiring part.

The first sensing cell part may be configured by repeatedly arranging a first sensing cell line group by a first repetition number to be spaced apart in an X-axis direction perpendicular to a Y-axis direction, the first sensing cell line group consisting of a plurality of sensing cells arranged and connected in the Y-axis direction.

The first wiring part may be formed in one outer bezel area in a Y-axis direction from the first sensing cell part. The first wiring part may include a first outgoing wire group and a first dummy wire group.

The first outgoing wire group may be configured with first outgoing wires as many as a first outgoing number corresponding to the first repetition number, one end of each of the first outgoing wires being connected to the first sensing cell line group.

The first dummy wire group may be configured with first dummy wires as many as a first dummy number, one end of each of the first dummy wires being not connected to the first sensing cell line group.

Other ends of the first outgoing wires and the first dummy wires may be connected to a pad electrode.

The touch sensor of the present invention may include a first repeating pattern part having a second sensing cell line group and a second wiring part.

The second sensing cell line group may be configured with a plurality of sensing cells spaced apart in the −X-axis direction from the first sensing cell part to be arranged and connected in a row in the Y-axis direction.

The second wiring part may be formed in the bezel area in a direction in which the first wiring part is formed from the second sensing cell line group. The second wiring part may include one second outgoing wire and a second dummy wire group.

One end of the second outgoing wire may be connected to the second sensing cell line group.

The second dummy wire group may consist of second dummy wires as many as a second dummy number, one end of each of the second dummy wires being not connected to the second sensing cell line group.

The second outgoing wire and the second dummy wire group may be connected to the first dummy wires of the first dummy wire group directed in the −X-axis direction.

In the touch sensor of the present invention, the second sensing cell line group and the second wiring part may be repeatedly formed as many as a second repetition number of two or more in the −X-axis direction. In this case, the second dummy wire group may include the second dummy wires in a number less than the second repetition number by one.

The touch sensor of the present invention may include a second repeating pattern part having a third sensing cell line group and a third wiring part.

The third sensing cell line group may be configured with a plurality of sensing cells spaced apart in the +X-axis direction from the first sensing cell part to be arranged and connected in a row in the Y-axis direction.

The third wiring part may be formed in the bezel area in a direction in which the first wiring part is formed from the third sensing cell line group. The third wiring part may include one third outgoing wire and a third dummy wire group.

One end of the third outgoing wire may be connected to the third sensing cell line group.

The third dummy wire group may consist of third dummy wires as many as a third dummy number, one end of each of the third dummy wires being not connected to the third sensing cell line group.

The third outgoing wire and the third dummy wire group may be connected to the first dummy wires of the first dummy wire group directed in the +X-axis direction.

In the touch sensor of the present invention, the third sensing cell line group and the third wiring part may be repeatedly formed as many as a third repetition number of two or more in the +X-axis direction. In this case, the third dummy wire group may include the third dummy wires in a number less than the third repetition number by one.

In the touch sensor of the present invention, the first dummy wire group may include the first dummy wires as many as a number corresponding to a sum of the second repetition number and the third repetition number.

In the touch sensor of the present invention, the non-repeating pattern part, the first repeating pattern part, and the second repeating pattern part may be formed repeatedly in the same shape along the X-axis.

In the touch sensor of the present invention, the non-repeating pattern part may have a symmetrical structure along the X-axis.

In the touch sensor of the present invention, the non-repeating pattern part may have an asymmetrical structure along the X-axis.

In the touch sensor of the present invention, the first repeating pattern part and the second repeating pattern part may have a symmetrical structure around the non-repeating pattern part.

In the touch sensor of the present invention, the first repeating pattern part and the second repeating pattern part may have an asymmetrical structure around the non-repeating pattern part.

Advantageous Effects

The touch sensor of the present invention having such a configuration can freely adjust (enlarge) the length of the long side of the pattern area by applying the stitch method while arranging the pad electrode connection wiring connecting the pad part, that is, the bonding pad, on the long side. As a result, the touch sensor of the present invention can make it easy to manufacture a rectangular large-area touch sensor used in a display device having a narrow and long shape.

DESCRIPTION OF DRAWINGS

FIG. 1 is a plan view illustrating a touch sensor of the first embodiment according to the present invention.

FIG. 2 is a plan view illustrating a touch sensor of the second embodiment according to the present invention.

FIG. 3 is a plan view illustrating a touch sensor of the third embodiment according to the present invention.

FIG. 4 illustrates an example of an exposure mask for manufacturing the touch sensor of the first embodiment according to the present invention with stitch exposure.

BEST MODE

Hereinafter, the present invention will be described in more detail with reference to the drawings.

FIG. 1 is a plan view illustrating a touch sensor of the first embodiment according to the present invention.

As shown in FIG. 1, the touch sensor of the first embodiment may include a non-repeating pattern part A, a first repeating pattern part B1, a second repeating pattern part C1, and so on.

The non-repeating pattern part A forms a region in which one side is connected to a bonding pad of the FPCB (not shown), and it may include a first sensing cell part S1, a first wiring part L1, and so on.

The first sensing cell part S1 generates a sensing signal when sensing an external touch, and it may include a plurality of sensing cell groups composed of a plurality of sensing cells. The sensing cell group may include one or more Y-axis sensing cell line groups consisting of a plurality of sensing cells arranged and connected in Y-axis direction (up and down in FIG. 1) and one or more X-axis sensing cell line groups consisting of a plurality of sensing cells arranged and connected in X-axis direction (left and right in FIG. 1) perpendicular to the Y-axis direction.

The Y-axis sensing cell line groups may be arranged as many as the first repetition number (four in FIG. 1) while being spaced apart along the X-axis direction. The sensing cells of the Y-axis sensing cell line group may be integrally connected along the Y-axis direction.

The X-axis sensing cell line groups may be configured by arranging a plurality of them (four in FIG. 1) while being spaced apart along the Y-axis direction. The sensing cells of the X-axis sensing cell line group may be connected through a conductive bridge or the like along the X-axis direction.

The sensing cell can be configured in the form of an island. It can be composed of a transparent conductive oxide, for example, conductive oxides such as indium tin oxide (ITO), indium zinc oxide (IZO), aluminum zinc oxide (AZO), zinc oxide (ZnOx), titanium oxide (TiO$_2$), aluminum oxide (Al$_2$O$_3$). In addition, indium zinc tin oxide (IZTO), indium oxide (InOx), tin oxide (SnOx), cadmium tin oxide (CTO), gallium-doped zinc oxide (GZO), zinc tin oxide (ZTO), indium gallium oxide (IGO) or the like, or a combination of two or more thereof may also be used. The sensing cell may be composed of a conductive metal, an alloy, or a laminate including a metal. In addition, the sensing cell may be of a mesh type or the like capable of increasing light transmittance.

The first wiring part L1 is connected between the sensing cell and an external device, for example, a pad electrode to transmit a sensing signal. The first wiring part L1 may be formed in one outer bezel area (lower side in FIG. 1) in the Y-axis direction from the first sensing cell part S1. The first wiring part L1 may be composed of a conductive metal, for example, silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), or an alloy thereof (e.g., silver-palladium-copper (APC)).

The first wiring part L1 may include a first outgoing wire group L11 and first dummy wire groups L12 and L13.

The first outgoing wire group L11 has one end (upper side in FIG. 1) connected to the outermost sensing cell (the lowermost sensing cell in FIG. 1) of the Y-axis sensing cell line group, and it may include as many first outgoing wires (4 wires in the L11 box in FIG. 1) as the first repetition number (four in FIG. 1) corresponding to a first outgoing number (four in FIG. 1).

The first dummy wire groups L12 and L13 may be composed of as many first dummy wires (in FIG. 1, five wires in L12 box and five wires in L13 box) as a first dummy number in which one end (the ends in the −X-axis direction and the +X-axis direction in FIG. 1) is not connected to the outermost sensing cell (the lowermost sensing cell in FIG. 1) of the Y-axis sensing cell line group. Here, the first dummy number is determined according to the repetition number in the X-axis direction of the Y-axis sensing cell line group formed in the first repeating pattern part B1 and the second repeating pattern part C1. For example, when five (B1 to B5) of the first repeating pattern part B1 are formed in the −X-axis direction, five dummy wires L12 are formed in the direction of the first repeating pattern part B1 (−X-axis direction). When five (C1 to C5) of the second repeating pattern part C1 are formed in the +X-axis direction, five dummy wires L13 are formed in the direction of the second repeating pattern part C1 (+X-axis direction). Then, the first dummy number is 10, and a total of 10 dummy wires may be formed. That is, the dummy wires of the first dummy wire groups L12 and L13 connect each of the Y-axis sensing cell line groups formed in the repeating patterns B1 to B5 of the first repeating pattern part B1 and the repeating patterns C1 to C5 of the second repeating pattern part C1 to an external device (e.g., FPCB), and at least the number of repetitions of the first repeating pattern part B1 and the second repeating pattern part C1 may be formed.

In the first dummy wire groups L12 and L13, the plurality of first dummy wires may be sequentially connected to the Y-axis sensing cell line groups moving away from the first repeating pattern part B1 and the second repeating pattern part C1 to the outside (−X-axis direction or +X-axis direction) respectively in the order away from the first sensing cell part S1 (going downward in FIG. 1).

The other ends (bottom in FIG. 1) of the first outgoing wires and the first dummy wires described above may be connected to an external device, for example, a bonding pad of an FPCB through a pad electrode.

The first repeating pattern part B1 is formed to be spaced apart from the non-repeating pattern part A in one of the X-axis directions (left in FIG. 1, that is, the −X-axis direction), and it may include a second sensing cell part S2, a second wiring part L2, and so on.

The second sensing cell part S2 generates a sensing signal when sensing an external touch, and it may include a plurality of sensing cells. The plurality of sensing cells includes one Y-axis sensing cell line group arranged in the Y-axis direction (up and down in FIG. 1) and one or more X-axis sensing cell line groups arranged in the X-axis direction (left and right in FIG. 1) perpendicular to the Y-axis direction.

The sensing cells of the Y-axis sensing cell line group may be integrally connected along the Y-axis direction.

The X-axis sensing cell line groups may be configured by arranging a plurality of them (four in FIG. 1) while being spaced apart along the Y-axis direction. The sensing cells of the X-axis sensing cell line group may be connected through a conductive bridge or the like along the X-axis direction.

The sensing cell can be configured in the form of an island, and it may be formed of the transparent conductive oxide described above or the like.

The second wiring part L2 may include a second outgoing wire L21 and a second dummy wire group L22.

The second outgoing wire L21 may have one end (upper left side in FIG. 1) connected to the outermost sensing cell (the lowermost sensing cell in FIG. 1) of the Y-axis sensing cell line group and the other end (right end in FIG. 1) connected to one end (left end in FIG. 1) of the innermost dummy wire (closest to L11 in FIG. 1) formed in the direction of the second wiring part L2 (left in FIG. 1, that is, −X-axis direction) among the first dummy wire groups L12 and L13 of the non-repeating pattern part A.

The second dummy wire group L22 may include a second dummy wire in which one end (left end in FIG. 1) is not connected to the outermost sensing cell (the lowermost sensing cell in FIG. 1) of the Y-axis sensing cell line group in the first repeating pattern part B1. The second dummy wires may be formed as many as a second dummy number (four in FIG. 1). The second dummy number may correspond to the number of times of repeatedly forming the first repeating pattern part B1 outside the first repeating pattern part B1 (the left side in FIG. 1, that is, in the −X-axis direction). For example, if the first repeating pattern part B1 is additionally repeated 4 times (B2 to B5) outside the first repeating pattern part B1 (in the −X-axis direction in FIG. 1), the second dummy wires included in the second dummy wire group L22 may be four. As such, the second sensing cell part S2 and the second wiring part L2 may be repeated as many as the second repetition number (five in FIG. 1) of two or more in the −X-axis direction (left in FIG. 1). In this case, the second dummy wire group L22 may include the second dummy wires in a number (4) less than the second repetition number (5 in FIG. 1) by one.

In the second dummy wire group L22, one end (left end in FIG. 1) of the innermost second dummy wire (uppermost in FIG. 1) of the four second dummy wires may be connected to the outer end (lower right end in FIG. 1) of the second outgoing wire L21 of the first repeating pattern part B2 that is repeated for the second time, and the other end (right end in FIG. 1) may be connected to one end (−X-axis direction in FIG. 1, that is, the left end) of the second dummy wire from the inside formed in the direction of the second wiring part L2 among the first dummy wire group L12 of the non-repeating pattern part A.

In the second dummy wire group L22, the second dummy wires may have the same shape and may be disposed to be spaced apart from each other with the same interval.

The second repeating pattern part C1 is formed spaced apart from the non-repeating pattern part A in the other direction of the X-axis (the right side in FIG. 1, that is, the +X-axis direction), and it may include a third sensing cell part S3, a third wiring part L3, and so on.

The third sensing cell part S3 generates a sensing signal when sensing an external touch, and it may include a plurality of sensing cells. The plurality of sensing cells may include one Y-axis sensing cell line group arranged in Y-axis direction (up and down in FIG. 1) and one or more X-axis sensing cell line groups arranged in X-axis direction (left and right in FIG. 1) perpendicular to the Y-axis direction.

The sensing cells of the Y-axis sensing cell line group may be integrally connected along the Y-axis direction.

The X-axis sensing cell line groups may be configured by arranging a plurality of them (four in FIG. 1) while being spaced apart along the Y-axis direction. The sensing cells of the X-axis sensing cell line group may be connected through a conductive bridge or the like along the X-axis direction.

The sensing cell can be configured in the form of an island, and it may be formed of the transparent conductive oxide described above or the like.

The third wiring part L3 may include one third outgoing wire L31 and a third dummy wire group L32.

The third outgoing wire L31 may have one end (upper right side in FIG. 1) connected to the outermost sensing cell (the lowermost sensing cell in FIG. 1) of the Y-axis sensing cell line group and the other end (left end in FIG. 1) connected to one end (right end in FIG. 1) of the innermost dummy wire (closest to L11 in FIG. 1) formed in the direction of the third wiring part L3 (right side in FIG. 1, that is, +X-axis direction) among the first dummy wire groups L12 and L13 of the non-repeating pattern part A.

The third dummy wire group L32 may include a third dummy wire in which one end (right end in FIG. 1) is not connected to the outermost sensing cell (the lowermost sensing cell in FIG. 1) of the Y-axis sensing cell line group in the second repeating pattern part C1. The third dummy wires may be formed as many as a third dummy number (four in FIG. 1). The third dummy number may correspond to the number of times of repeatedly forming the second repeating pattern part C1 outside the second repeating pattern part C1 (the right side in FIG. 1, that is, in the +X-axis direction). For example, if the second repeating pattern part C1 is additionally repeated 4 times (C2 to C5) outside the second repeating pattern part C1 (in the +X-axis direction in FIG. 1), the third dummy wires included in the third dummy wire group L32 may be four. As such, the third sensing cell part S3 and the third wiring part L3 may be repeated as many as the third repetition number (five in FIG. 1) of two or more in the +X-axis direction (right in FIG. 1). In this case, the third dummy wire group L32 may include the third dummy wires in a number (4) which is less than the third repetition number (5 in FIG. 1) by one.

In the third dummy wire group L32, one end (right end in FIG. 1) of the innermost third dummy wire (uppermost in FIG. 1) of the four third dummy wires may be connected to the outer end (lower left end in FIG. 1) of the third outgoing wire L31 of the second repeating pattern part C2 that is repeated for the second time, and the other end (left end in FIG. 1) may be connected to one end (+X-axis direction in FIG. 1, that is, the right end) of the second dummy wire from the inside formed in the direction of the third wiring part L3 among the first dummy wire group L13 of the non-repeating pattern part A.

In the third dummy wire group L32, the third dummy wires may have the same shape and may be disposed to be spaced apart from each other with the same interval.

In the touch sensor of the first embodiment, as shown in FIG. 1, the first repeating pattern part B1 may be formed repeatedly (B2 to B5) in the same shape outside the first repeating pattern part B1 (on the left side in FIG. 1, that is, in the −X-axis direction), and the second repeating pattern part C1 may also be formed repeatedly (C2 to C5) in the same shape outside the second repeating pattern part C1 (on the right side in FIG. 1, that is, in the +X-axis direction). Here, the first and second repetition numbers may be selected according to the length of the long side.

The touch sensor of the first embodiment may repeatedly form the combined form of the non-repeating pattern part A, the repeating patterns B1 to B5 of the first repeating pattern part B1, and the repeating patterns C1 to C5 of the second repeating pattern part C1 along the X-axis.

The touch sensor of the first embodiment, as shown in FIG. 1, may form the non-repeating pattern part A, that is, the first sensing cell part S1 and the first wiring part L1 symmetrically along the X-axis (that is, left and right).

Also, as shown in FIG. 1, the touch sensor of the first embodiment may form repeating patterns B1 to B5 of the first repeating pattern part B1 and repeating patterns C1 to C5 of the second repeating pattern part C1 symmetrically around the non-repeating pattern part A along the X-axis (that is, left and right).

In addition, the touch sensor of the first embodiment may form a wiring part connected to one or more X-axis sensing cell line groups arranged and connected along the X-axis (left and right in FIG. 1) and spaced apart along the Y-axis (up and down in FIG. 1) in one end in the X-axis direction, that is, at least one of the bezel areas of the left and right ends.

FIG. 2 is a plan view illustrating a touch sensor of the second embodiment according to the present invention.

The touch sensor of the second embodiment forms the non-repeating pattern part A', that is the first sensing cell part and the first wiring part asymmetrically along the X-axis (that is, left and right).

As shown in FIG. 2, three Y-axis sensing cell line groups may be formed in the first sensing cell part. In this case, three (odd number) outgoing wires are formed in the first wiring part, which makes the outgoing wires asymmetric. As a result, even if the repeating patterns B1 to B5 of the first repeating pattern part B1 and the repeating patterns C1 to C5 of the second repeating pattern part C1 on either side of the non-repeating pattern part A' in the X-axis direction are formed symmetrically (with the same number of repetitions), either side of the first dummy wire group in the X-axis direction (that is, left and right) in the non-repeating pattern part A' with respect to the Y-axis may have different shapes.

FIG. 3 is a plan view illustrating a touch sensor of the third embodiment according to the present invention.

In the touch sensor of the third embodiment, as shown in FIG. 3, repetition numbers of the first repeating pattern part B1 and the second repeating pattern part C1 may be different in the repeating patterns B1 to B5 of the first repeating pattern part B1 and the repeating patterns C1 to C4 of the second repeating pattern part C1. In this case, the X-axis (that is, left and right) widths (or the number of repetitions of the Y-axis sensing cell line groups) of the repeating patterns B1 to B5 of the first repeating pattern part B1 and the repeating patterns C1 to C4 of the second repeating pattern part C1 around the non-repeating pattern part A may become different. As a result, the number of dummy wires of the second dummy wire group of the first repeating pattern part B1 and the third dummy wire group of the second repeating pattern part C1 become different, which makes the repeating patterns B1 to B5 of the first repeating pattern part B1 and the repeating patterns C1 to C4 of the second repeating pattern part C1 asymmetrical around the non-repeating pattern part A along the X-axis (that is, left and right).

FIG. 4 illustrates an example of an exposure mask for manufacturing the touch sensor of the first embodiment according to the present invention with stitch exposure.

As shown in FIG. 4, the exposure mask for manufacturing the touch sensor of the first embodiment may be configured to separate or integrate the non-repeating pattern part A, the first repeating pattern part B1, the second repeating pattern part C1, and so on. The non-repeating pattern part A, the first repeating pattern part B1, the second repeating pattern part C1 may be separately exposed for each region, and may have overlapping regions at the boundary of the regions.

When the exposure mask is integrally formed, when the first repeating pattern part B1 or the second repeating pattern part C1 is repeatedly exposed, the non-repeating pattern part A and the second repeating pattern part C1, or the non-repeating pattern part A and the first repeating pattern part B1 may be closed (covered) to repeatedly expose the first repeating pattern part B1 or the second repeating pattern part C1, respectively.

The exposure mask may be configured by separating the configuration of the sensing cell part and the outgoing wire (group) into different mask patterns that are not integrated according to each layered structure and material. In this case, each of the pattern parts A, B1, and C1 regions may have the same shape for each individual mask, and the number of repeating parts may be configured differently if necessary.

Although particular embodiments of the present invention have been shown and described, it will be understood by those skilled in the art that it is not intended to limit the present invention to the preferred embodiments, and it will be obvious to those skilled in the art that various changes and modifications may be made without departing from the spirit and scope of the invention.

The scope of the present invention, therefore, is to be defined by the appended claims and equivalents thereof.

[Description of reference numerals]

| | |
|---|---|
| A, A': non-repeating pattern part | B1: first repeating pattern part |
| C1: second repeating pattern part | S1~S3: first to third sensing cell part |
| L1~L3: first to third wiring part | |
| L11, L21, L31: first to third outgoing wire (group) | |
| L12, L13: first dummy wire group | L22: second dummy wire group |
| L32: third dummy wire group | |

The invention claimed is:

1. A touch sensor comprising:
a non-repeating pattern part;
a first repeating pattern part; and
a second repeating pattern part,
the non-repeating pattern part comprising:
a first sensing cell part repeatedly arranging a first sensing cell line group by a first repetition number to be spaced apart in an X-axis direction, the first sensing cell line group consisting of a plurality of sensing cells arranged and connected in a Y-axis direction; and
a first wiring part comprising:
a first outgoing wire group formed in one outer bezel area in the Y-axis direction from the first sensing cell part, the first outgoing wire group consisting of first outgoing wires as many as a first outgoing number corresponding to the first repetition number, one end of each of the first outgoing wires being connected to the first sensing cell line group; and
a first dummy wire group consisting of first dummy wires as many as a first dummy number, one end of each of the first dummy wires being not connected to the first sensing cell line group, wherein other ends of the first outgoing wires and the first dummy wires are connected to a pad electrode,
the first repeating pattern part comprising:
a second sensing cell line group spaced apart in the −X-axis direction from the first sensing cell part, the second sensing cell line group consisting of a plurality of sensing cells arranged and connected in a row in the Y-axis direction; and
a second wiring part comprising:
a second outgoing wire formed in the bezel area in a direction in which the first wiring part is formed from the second sensing cell line group, one end of which being connected to the second sensing cell line group; and
a second dummy wire group consisting of second dummy wires as many as a second dummy number, one end of each of the second dummy wires being not connected to the second sensing cell line group, wherein the second outgoing wire and the second dummy wire group are connected to the first dummy wires of the first dummy wire group directed in the −X-axis direction, and
the second repeating pattern part comprising:
a third sensing cell line group spaced apart in the +X-axis direction from the first sensing cell part, the third sensing cell line group consisting of a plurality of sensing cells arranged and connected in a row in the Y-axis direction; and
a third wiring part comprising:
a third outgoing wire formed in the bezel area in a direction in which the first wiring part is formed from the third sensing cell line group, one end of which being connected to the third sensing cell line group; and
a third dummy wire group consisting of third dummy wires as many as a third dummy number, one end of each of the third dummy wires being not connected to the third sensing cell line group, wherein the third outgoing wire and the third dummy wire group are connected to the first dummy wires of the first dummy wire group directed in the +X-axis direction.

2. The touch sensor according to claim 1, wherein:
the second sensing cell line group and the second wiring part are repeatedly formed as many as a second repetition number of two or more in the −X-axis direction, and
the second dummy wire group includes the second dummy wires in a number less than the second repetition number by one.

3. The touch sensor according to claim 2, wherein:
the third sensing cell line group and the third wiring part are repeatedly formed as many as a third repetition number of two or more in the +X-axis direction, and
the third dummy wire group includes the third dummy wires in a number less than the third repetition number by one.

4. The touch sensor according to claim 3, wherein the first dummy wire group includes the first dummy wires as many as a number corresponding to a sum of the second repetition number and the third repetition number.

5. The touch sensor according to claim 4, wherein the non-repeating pattern part, the first repeating pattern part, and the second repeating pattern part are formed repeatedly in the same shape along the X-axis.

6. The touch sensor according to claim 1, wherein the non-repeating pattern part has a symmetrical structure along the X-axis.

7. The touch sensor according to claim 1, wherein the non-repeating pattern part has an asymmetrical structure along the X-axis.

8. The touch sensor according to claim 1, wherein the first repeating pattern part and the second repeating pattern part have a symmetrical structure around the non-repeating pattern part.

9. The touch sensor according to claim 1, wherein the first repeating pattern part and the second repeating pattern part have an asymmetrical structure around the non-repeating pattern part.

* * * * *